United States Patent
Diethorn et al.

(10) Patent No.: US 7,796,758 B2
(45) Date of Patent: Sep. 14, 2010

(54) METHOD AND APPARATUS FOR SECURING TRANSMISSION ON A SPEAKERPHONE OR TELECONFERENCE CALL

(75) Inventors: Eric Diethorn, Long Valley, NJ (US); Lawrence O'Gorman, Madison, NJ (US); Thomas Walsh, Toronto (CA)

(73) Assignee: Avaya Inc., Basking Ridge, NJ (US)

( * ) Notice: Subject to any disclaimer, the term of this patent is extended or adjusted under 35 U.S.C. 154(b) by 1023 days.

(21) Appl. No.: 11/527,035

(22) Filed: Sep. 26, 2006

(65) Prior Publication Data

US 2008/0084985 A1    Apr. 10, 2008

(51) Int. Cl.
 *H04M 15/06* (2006.01)
(52) U.S. Cl. .................. 380/257; 380/253; 379/142.08
(58) Field of Classification Search .......... 380/257, 380/253; 379/142.18, 93.26, 145, 283
See application file for complete search history.

(56) References Cited

U.S. PATENT DOCUMENTS

| | | | | |
|---|---|---|---|---|
| 4,972,469 A | * | 11/1990 | Saltwick et al. ............ 380/2 |
| 5,148,478 A | * | 9/1992 | Saltwick et al. ............ 380/253 |
| 5,168,519 A | * | 12/1992 | Scarinci et al. ............ 380/253 |
| 5,177,785 A | * | 1/1993 | Itani et al. ............ 380/253 |
| 5,181,243 A | * | 1/1993 | Saltwick et al. ............ 380/253 |
| 5,191,607 A | | 3/1993 | Meyers et al. |
| 6,385,572 B2 | | 5/2002 | Hu |
| 2002/0076039 A1 | * | 6/2002 | Levens ............ 379/418 |

* cited by examiner

*Primary Examiner*—Creighton Smith
(74) *Attorney, Agent, or Firm*—Cohen Pontani Lieberman & Pavane LLP

(57) ABSTRACT

Method and apparatus for securing the transmission of DTMF signals by a telephone over a telephone line. If the telephone is operating in a mode wherein another party may hear any DTMF tone generated by the telephone, such as over the loudspeaker of a speakerphone or as part of a conference call, the telephone prevents generation of an audible signal which predictably corresponds to the actual DTMF value of any button pushed by the user.

20 Claims, 1 Drawing Sheet

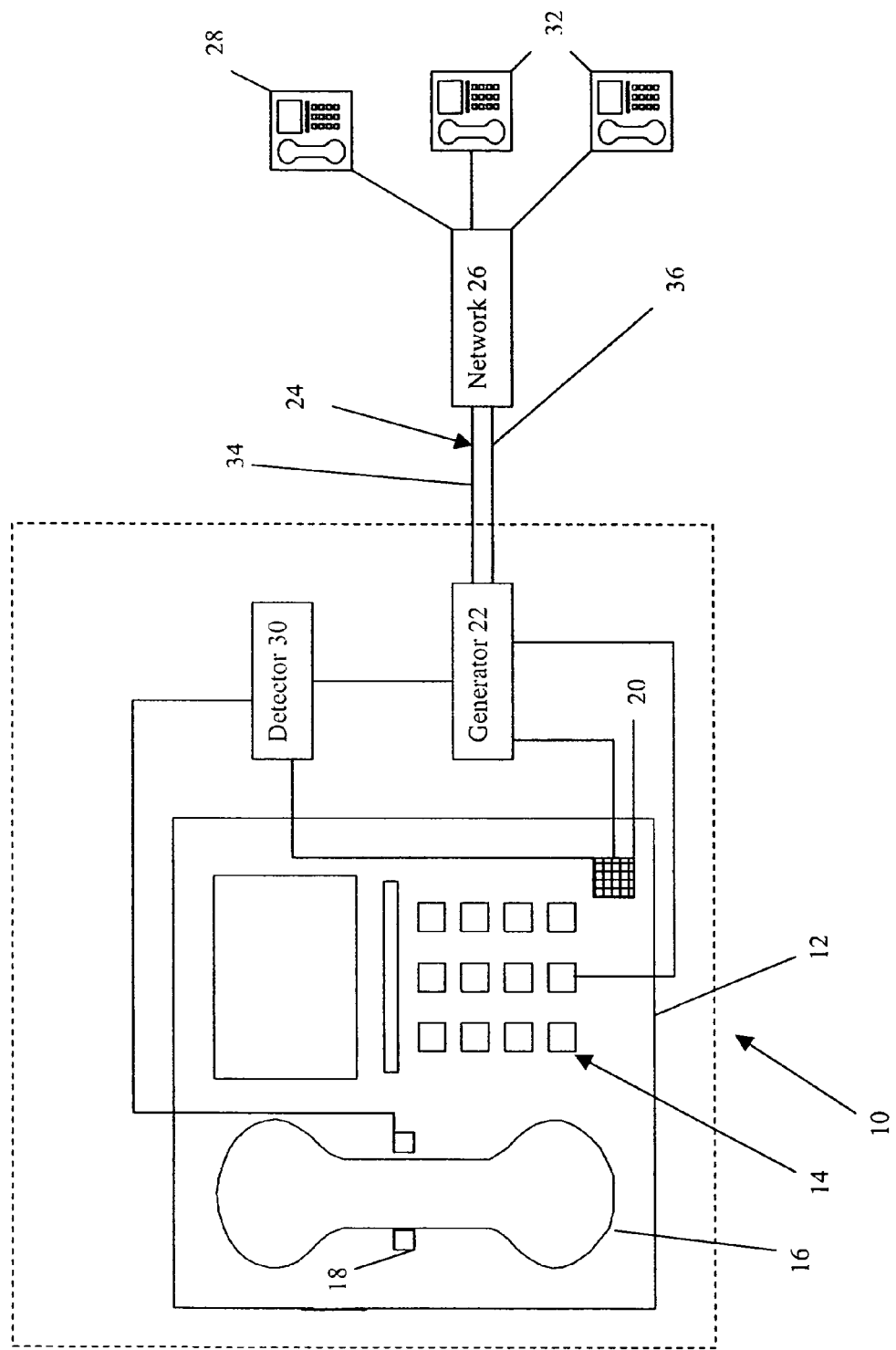
FIGURE

METHOD AND APPARATUS FOR SECURING TRANSMISSION ON A SPEAKERPHONE OR TELECONFERENCE CALL

BACKGROUND OF THE INVENTION

1. Field of the Invention

This invention relates to the field of security in telephony and, more particularity, to the field of allowing the secure use of DTMF tones on a telephone while the telephone is engaged in a conference call or in an environment in which the DTMF tones may be overheard, such as over the loudspeaker of a speakerphone.

2. Description of the Related Art

Standard tone-dial telephone pads utilize a standardized tone generation format called Dual Tone Multi Frequency (DTMF) to generate the familiar telephone tones to "dial" a telephone on a telephone line over a telephone network. In conventional telephones, once a handset (or headset or speakerphone) is active (either by being lifted up or by activation of a speakerphone feature), any touching of a button on the telephone's keypad will generate the DTMF tone associated with the value of the button (0-9, # or *). This tone is audible through the earpiece of the handset or headset or through the loudspeaker of the speakerphone, so that the user is made aware of the fact that the button was depressed. The DTMF tones vary, with each of the DTMF values being associated with a specific combination of frequencies, or tone.

When the buttons being depressed correspond to security numbers, such as, for example, passwords or access codes, generating a recognizable, audible, DTMF tone poses a security risk, because the other parties on the line of a conference call with the user or anyone who is within earshot of the speakerphone will hear the tones. Since the tones are standard tones, hearing the tones allows the other parties to know the buttons that were pushed, and therefore have complete possession of the security number. For example, anyone in a crowded office who uses their office speakerphone to access their bank information is giving access to their PIN number to everyone in their immediate vicinity.

In the analogous visual situation, where a password is entered manually via a keyboard, it is standard for the monitor to display an asterisk ("*") in response to any keystroke so that anyone who can see the monitor does not see the password as it is entered. There is no known analogue to this procedure for the audio signals generated by a DTMF telephone while in the speakerphone mode. For this reason, some speakerphone manufacturers place a warning in their manuals instructing the user not to use the keypad to generate security-based DTMF tones while others can hear them.

One related, but dissimilar, technology is referred to as "ring tone muting", in which a manual button on a telephone may activate a feature which disables the ring tone of a multi-line telephone when a user is on another line. This feature allows a user on one line of the multi-line telephone to speak on that line without being interrupted by another line ringing through. This feature is described, for example, in U.S. Pat. No. 5,191,607. This feature, however, is directed only to the ring tones of the telephone, not to the DTMF tone generated by the telephone. This feature is not directed to security and would not safeguard secret PINs, etc., as our invention proposes.

Thus, there is a need to increase the security available to users of DTMF-tone generating telephones.

SUMMARY OF THE INVENTION

It is an object of the invention to provide a method and apparatus for affording a level of security to a user of a telephone when the user has occasion to generate a DTMF output that may be audible to third parties.

Briefly stated, the invention is directed to a method and apparatus for securing the transmission of audible signals, such as DTMF signals, by a telephone over a telephone line. The invention includes recognizing when the telephone is operating in a mode where a party other than the user may hear an audible DTMF tone which is generated by the telephone, such as, for example, when using a speakerphone or during a conference call, and then preventing the telephone from generating a tone which is audible to anyone other than the user of the DTMF keypad associated with the telephone.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

The FIGURE is a schematic diagram of an embodiment of the inventive apparatus capable of executing the inventive method.

DETAILED DESCRIPTION OF THE PRESENTLY PREFERRED EMBODIMENTS

FIG. 1 depicts, generally at 10, a system for securing the transmission of signals output by a telephone 12 in accordance with the invention. These signals are preferably, but not necessarily, DTMF standard signals, but may be any type of signal which is generated by a telephone in response to input from the telephone.

In the preferred embodiment, system 10 includes a telephone 12 having means for accepting a user input (such as a keypad 14), a handset 16, means for actuating handset 16 (such as a standard telephone "hook" 18), and a speakerphone 20. Keypad 14 is coupled to a signal generator, such as a DTMF tone generator 22, which, in response to input from keypad 14, generates a standard (preferably DTMF) tone over a telephone line 24 through a telephone network 26 to a receiver 28. Receiver 28 is not a part of system 10, but receives the signal generated by system 10. According to DTMF protocol, a specific DTMF tone output over line 24 corresponds to the value of the specific key depressed on keypad 14, and any protocol which is recognized by system 10 and receiver 28 as providing a unique output to receiver 28 in response to a specific input to keypad 14 may be utilized.

System 10 further includes a detector 30 coupled to hook 18 and speakerphone 20, which detects if telephone 12 is active, for example by handset 16 being off hook 18 or by speakerphone 20 being activated. Detector 30 also is coupled to detect if telephone 12 is connected to one or more lines over network 26.

Network 26 may also be used to establish a conference call between telephone 12 and two or more receiving telephones 32. Preferably this is accomplished by bridging. Various types of bridging arrangements in a teleconferencing environment are described in U.S. Pat. Nos. 7,006,616; 6,438,111; 5,848,142; 5,784,448; 5,764,748; 5,363,441 and 4,577,065, the disclosures of which are hereby incorporated by reference.

In this application, it is preferred that telephone line 24 includes at least two separate channels of transmission 34, 36.

System 10 may be used to practice the inventive method. In accordance with the inventive method, the user activates telephone 12, for example by lifting handset 16 from hook 18 or activating speakerphone 20. Once telephone 12 is activated, detector 30 detects the activation of telephone 12. If speakerphone 20 is active, detector 30 instructs generator 22 not to transmit the generated signal to the loudspeaker of speakerphone 20.

This may be accomplished in different ways. The first is that no audible signal is transmitted to speakerphone 20, and so no sound whatsoever is produced by speakerphone 20 in response to the user pressing keys on keypad 14 while speakerphone 20 is activated. This prevents anyone, including the user of the telephone 12, from overhearing the recognizable tones generated by generator 22 in response to the pressing of any keys on keypad 14. In this circumstance, if the telephone has a visual display associated therewith, it would be possible to generate a visual display which indicates either the correct value of the button being pushed or a camouflaged display, such as the traditional "*" no matter which button is pushed.

Alternatively, generator 22 may generate audible signals that are audible over the loudspeaker of speakerphone 20, so long as the audible signals bear no relation to the value of the specific keys depressed on keypad 14. For example, generator 22 may generate the same audible signal no matter the value of the key depressed by the user; the signal could vary in a pre-set way, for example by increasing in pitch with each succeeding keystroke; or the signal could vary randomly with each succeeding keystroke. Under any protocol, the audio signal generated by speakerphone 20 bears no predictable relationship to the value of the key depressed on keypad 14 so that anyone overhearing the signal generated by the speakerphone 20 would not be able to ascertain the values of the specific keys depressed by merely hearing the tones generated by speakerphone 20.

As used herein, a signal which is not audible over speakerphone 20 or, if audible, bears no predictable relationship to the button being pressed, is referred to as a "camouflaged" signal.

If detector 30 detects that telephone 12 is engaged in a conference call, it so informs generator 22, which then separates any audio transmission from the user through telephone 12, either through handset 16 or speakerphone 20, to telephone receivers 32 on the conference call over a first channel 34, and sends any camouflaged signal desired to be transmitted to receiver 28 over a separate channel 36. In this way, receivers 32 never have access to the confidential portion of the transmission, and this portion of the transmission remains secure.

In another embodiment of the conferencing application, the phone instead sends the audible DTMF into the network as any normal phone does today. If telephone 12 is an analog telephone, the DTMF tones are transmitted in the same audio channel as speech. If telephone 12 is a digital, internet or packet-network phone, the DTMF tones may be sent in the same channel as speech or may be separated from the speech; either is allowed for in accordance with this invention. It is the conference bridge that detects DTMF tones and then prevents those tones from being transmitted to the other parties in the conference, by camouflaging them as described above.

To effectuate the embodiment in which the DTMF tones are transmitted over a channel which is different than that in which the speech is transmitted, telephone 12 must be capable of sending signals on two different channels, such as current Voice-over-Internet telephones sold by Avaya Technology Corp. under the model nos. IP4610, IP4620, IP9620 and IP9630.

Other combinations of the components described may work equally as well within the disclosure and scope of the invention. For example, speakerphone 20 need not be a physical part of telephone 12, but may be a separate physical or virtual device, controlled by any known means.

Receiver 28 may also be of any known type, such as a telephone router, to direct the telephone connection established by system 10 as desired, or a bank security system which receives the user's PIN code via the generated signal to access the user's confidential banking information, or the like. The nature of receiver 22 is not of importance to the instant invention, only that system 10 be adapted to transmit signals understood by receiver 28 as signifying the specific input from the user for transmission to receiver 28.

It is also possible that keypad 14 may be placed on handset 16, as is well-known, but the placement of keypad 14 in relation to telephone 12 and handset 14 is irrelevant to the practice of the invention and may be established in any desired configuration as is well within the ability of one of ordinary skill in the art to determine depending upon the hardware available and the dictates of the specific application confronted by the person of ordinary skill, without undue experimentation.

As a further alternative, it is noted that, in some environments, it may be possible for undesired third parties to overhear tones generated by the user's telephone over a standard handset or a headset, and the invention could be employed in such an environment, as well, in the same manner in which it is employed with a speakerphone as described.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for securing the transmission of predetermined signals by a telephone over a telephone line, said method comprising:

receiving an input from said telephone, wherein said input has a value which corresponds to a predetermined audio signal;

determining if said telephone is operating in a mode whereby a party other than the user of said telephone may hear said predetermined audio signal and thereby have the opportunity to ascertain said value; and generating a camouflaged signal over said telephone line corresponding to said value.

2. The method of claim 1,
wherein, when it has been determined that said telephone is operating in said mode whereby said party other than said user may hear said predetermined audio signal generated by said telephone, the method further comprises the step of generating an audible output to said telephone in response to said input; and
wherein said value of said input cannot be determined from merely listening to said audible output.

3. The method of claim 2, wherein said output is a single predetermined tone which does not vary with the value of said input.

4. The method of claim 2, wherein said output varies in a pre-determined pattern regardless of the value of said input.

5. The method of claim 2, wherein said output varies randomly regardless of the value of said input.

6. The method of claim 2, wherein said mode of operating is as a speakerphone, and said audible output is audible over said speakerphone.

7. The method of claim 2, wherein said mode of operating is as part of a telephone call, and said telephone does not generate an audible output over said telephone line during said telephone call in response to said input.

8. The method of claim 7, wherein said telephone call is a conference call.

9. The method of claim 8, wherein said conference call is a bridged conference call having at least first and second channels of transmission between said telephone and a plurality of different receivers;
wherein said camouflaged signal is transmitted on said first channel; and
wherein said conference call is handled over said second channel of transmission.

10. The method of claim 1, wherein said predetermined audio signals are DTMF tones.

11. Apparatus for securing the transmission of predetermined signals by a telephone over a telephone line, said apparatus comprising:
means for receiving an input from said telephone, wherein said input has a value which corresponds to a predetermined audio signal;
means for determining if said telephone is operating in a mode whereby a party other than the user of said telephone may hear said predetermined audio signal and thereby have the opportunity to ascertain said value; and
means for generating a camouflaged signal over said telephone line corresponding to said value.

12. The apparatus of claim 11, wherein said means for receiving said input is a keypad.

13. The apparatus of claim 11, further comprising:
means for generating an audible output to said telephone in response to said input, when it has been determined that said telephone is operating in said mode;
wherein said value of said input cannot be determined from merely listening to said audible output.

14. The apparatus of claim 13, wherein said audible output is a single tone which does not vary with the value of said input.

15. The apparatus of claim 13, wherein said audible output varies in a pre-determined pattern regardless of the value of said input.

16. The apparatus of claim 13, wherein said audible output varies randomly regardless of the value of said input.

17. The apparatus of claim 13, wherein said mode of operating is as a speakerphone, and said audible output is audible over said speakerphone.

18. The apparatus of claim 13, wherein said mode of operating is as part of a telephone call, and said telephone does not generate an audible output over said telephone line during said telephone call in response to said input.

19. The apparatus of claim 18, wherein said telephone call is a conference call.

20. The apparatus of claim 19, wherein said conference call is a bridged conference call having at least first and second channels of transmission between said telephone and a plurality of different receivers;
wherein said camouflaged signal is transmitted on said first channel; and
wherein said conference call is handled over said second channel of transmission.

* * * * *